T. D. BERKELEY.
AIR OR GAS COMPRESSOR.
APPLICATION FILED DEC. 18, 1914.

1,209,930.

Patented Dec. 26, 1916.
5 SHEETS—SHEET 1.

WITNESSES:
John C. Sanders
Dudley B. Howard

INVENTOR:
Tyrus Douglas Berkeley
ATTY.

T. D. BERKELEY.
AIR OR GAS COMPRESSOR.
APPLICATION FILED DEC. 18, 1914.

1,209,930.

Patented Dec. 26, 1916.
5 SHEETS—SHEET 3.

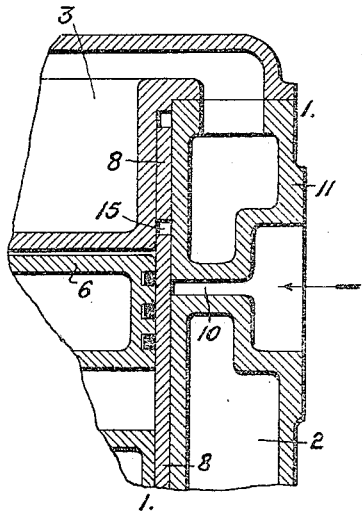
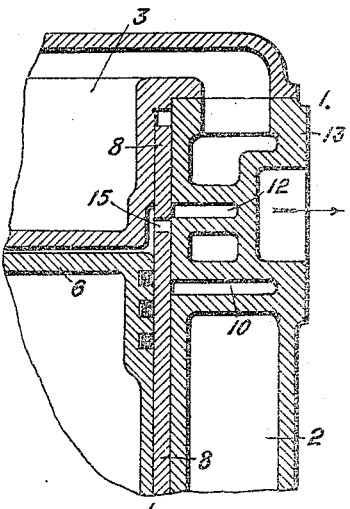
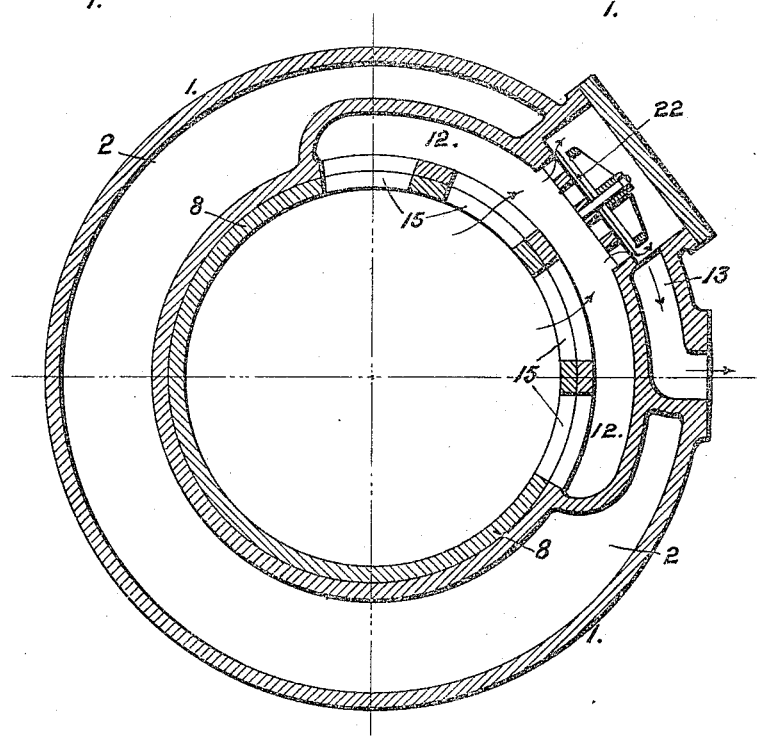

UNITED STATES PATENT OFFICE.

TYRUS DOUGLAS BERKELEY, OF RUABON, WALES.

AIR OR GAS COMPRESSOR.

1,209,930.

Specification of Letters Patent. Patented Dec. 26, 1916.

Application filed December 18, 1914. Serial No. 877,944.

*To all whom it may concern:*

Be it known that I, TYRUS DOUGLAS BERKELEY, a subject of the King of England, residing at Clifton, Ruabon, in the county of Denbigh, North Wales, United Kingdom of Great Britain and Ireland, have invented new and useful Improvements in Air or Gas Compressors, of which the following is a specification.

This invention has reference to air or gas compressors, and more particularly to those of the high speed type having a reciprocating sleeve valve between the cylinder and the piston or plunger; and it has for its object, to provide a compressor of the type which can be run at relatively very high speed without jar or knock, and without waste of energy or loss of efficiency through choking of the inlet or outlet, or impediment of discharge and inlet, and which is simple and inexpensive, and possesses a positive method of operating.

The improved air or gas compressor, constituting this invention, is illustrated in the accompanying drawings, and it—the invention—will be described in connection with them.

Figure 1:
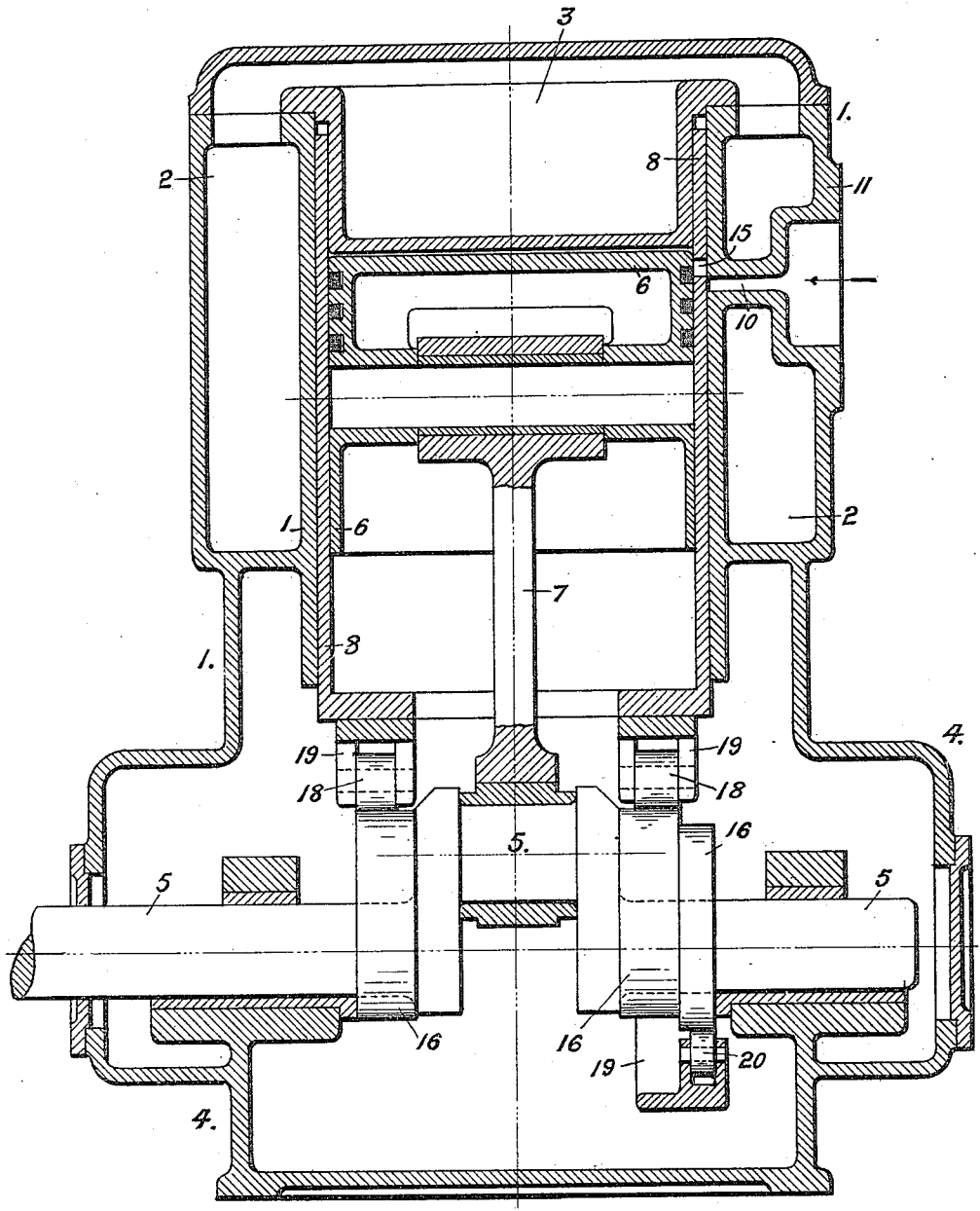
Figure 2:
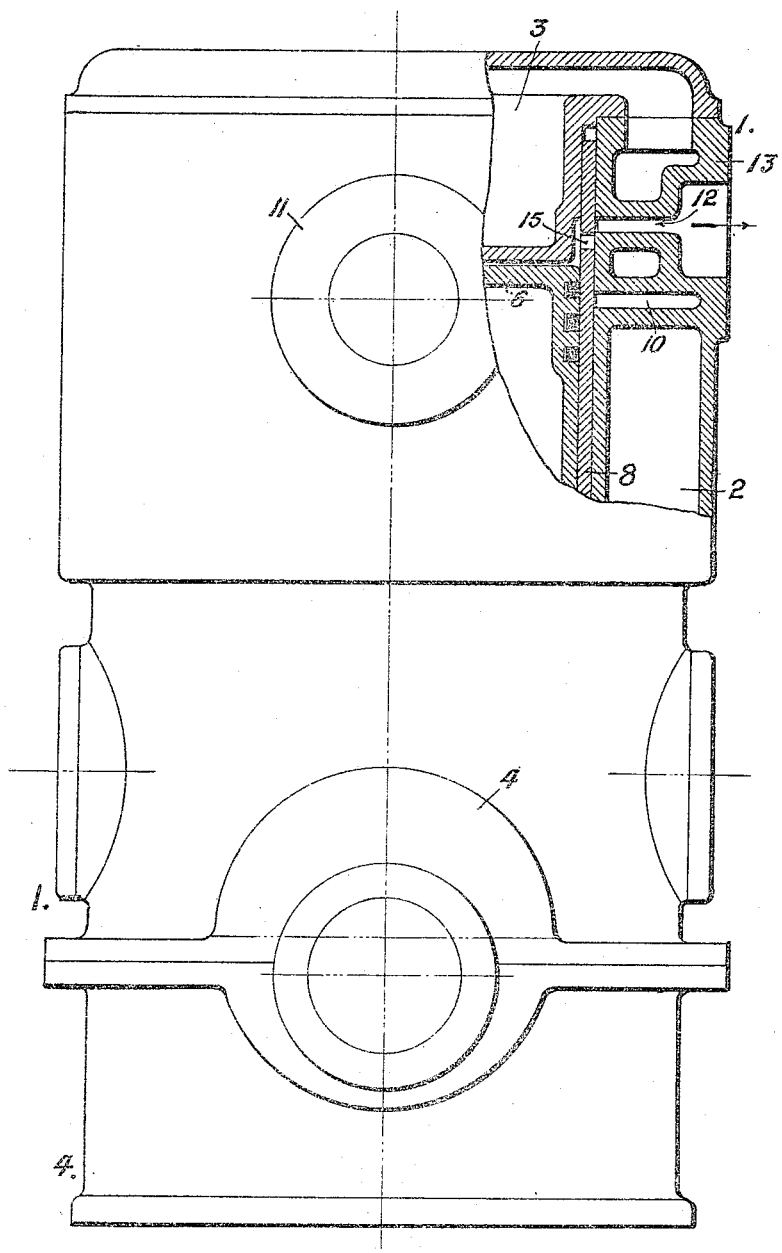
Figure 3:
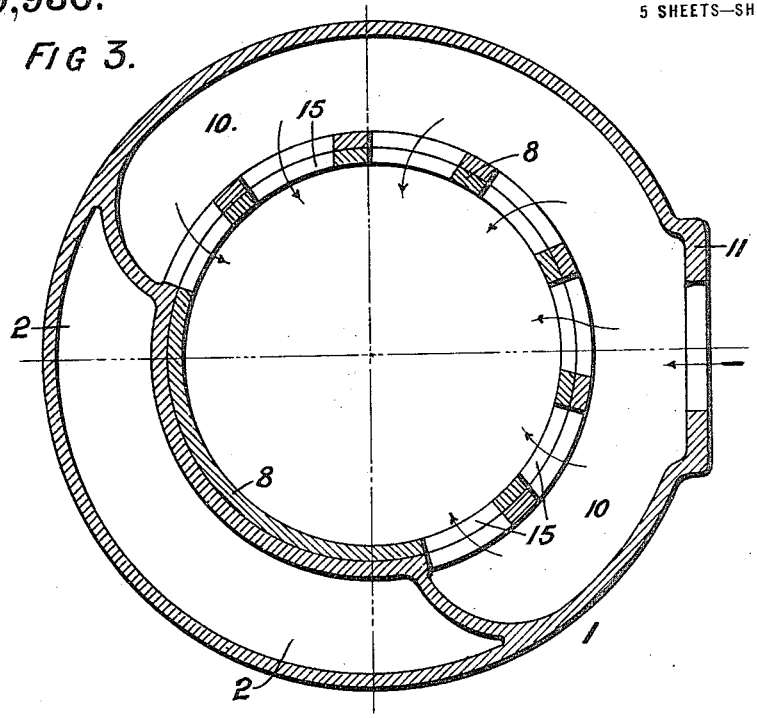
Figure 4:
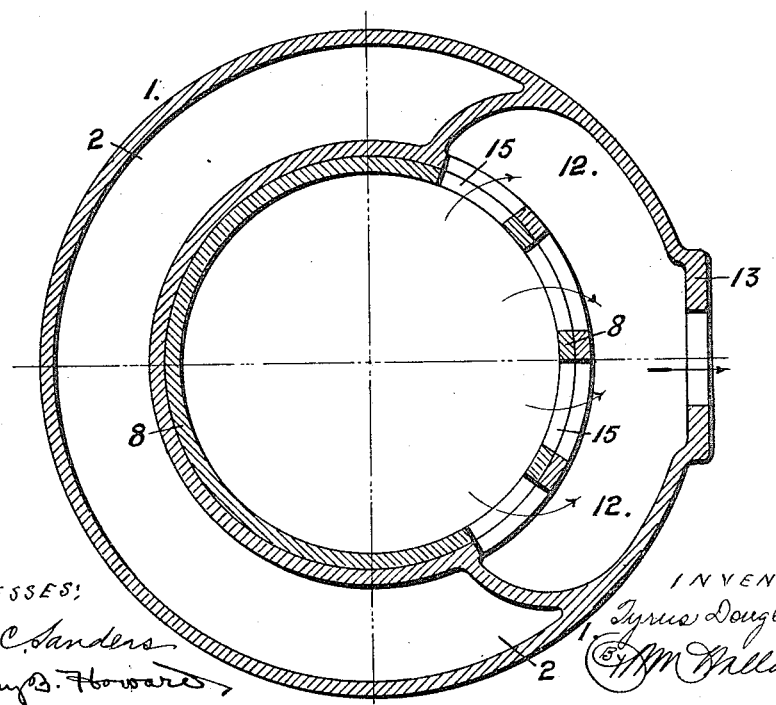
Figure 5:
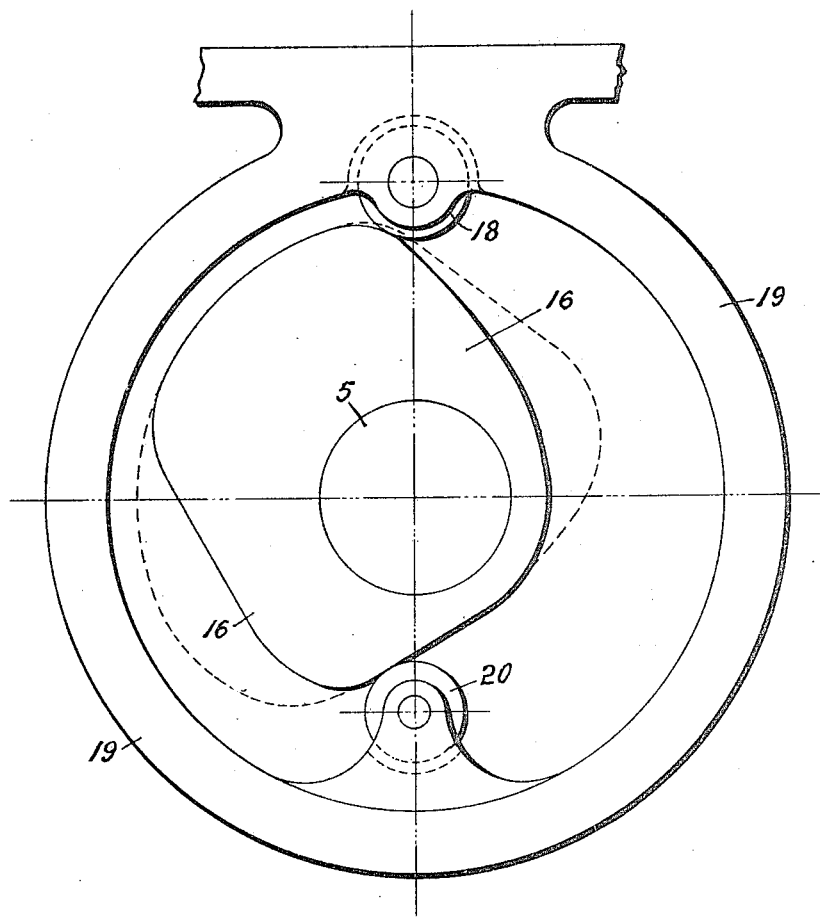

In these drawings, Figure 1 is a longitudinal sectional elevation of the compressor showing the air or gas inlet port in section; and Fig. 2 is an end view of the compressor partly in section, the section being through about the center of the delivery port of the cylinder; the supply and delivery pipe port connecting branches being arranged on the cylinder jacket at about 90 degrees from one another. Fig. 3 is a plan in section taken in the plane of the air and gas inlet port; and Fig. 4 is a plan in section taken in the plane of the delivery port; and Fig. 5 is a view showing the cam and parts operated by it for actuating the valve of the compressor, Figs. 6, 7, and 8 are respectively, vertical sections taken in the planes of the inlet port of the cylinder, and the delivery port; and a plan in section through the latter port, showing a modified arrangement in which the sleeve valve is operated by an eccentric or crank.

Referring to the drawings, 1 generally designates the cylinder of the compressor, which is provided with a jacket and water cooling space 2, and a water-cooled hollow cover 3.

4 is the base or body of the compressor, which in the case shown is cast in one with the cylinder 1; and 5 is the crank shaft.

6 is the piston; 7 is the rod connecting the crank of the crank shaft directly with the piston, which is of hollow trunk form; and 8 is the air or gas inlet and delivery controlling valve. This valve 8 is of sleeve form as shown, fitting in between the wall of the cylinder 1, and the piston 6, and the portion of the hollow cover 3 which depends into the upper portion of the cylinder 1; the annular space between which is filled by this sleeve valve.

The compressing cylinder 1 has an inlet port 10 at a certain level, extending around the greater portion of the cylinder, as seen in Fig. 3; and a delivery port 12 at a higher level in the cylinder than the port 10, and extending a substantial distance around the cylinder, as shown in Fig. 4; and these ports 10 and 12 are respectively provided with flanges or facings 11 and 13, to which, as may be required, suitable pipes or conduits can be attached for conducting air or gas to the compressor—where desired, and carrying it away.

The sleeve valve 8 is provided with ports 15 in it at a certain height and position; and it is so arranged in relation to the end of the cylinder; and the inlet and delivery ports 10 and 12 of the cylinder are so arranged and disposed, as to put these ports at the required periods into communication with the interior of the cylinder, and at other times cut them out of communication. These ports, as well as the cylinder ports 10 and 12, are preferably of grid form, as seen.

The sleeve valve 8 shown in Figs. 1 to 4 is combined with, and operated by cams 16 fixed on the crank shaft 5, and these cams are so formed, and the inlet and discharge ports 10 and 12, and the valve ports 15, so arranged in relation to each other, that the valve ports 15 will be opposite the inlet port 10, and communicating with it and the interior of the cylinder during the outstroke of the piston 6; but such communication will be cut off during the return stroke. And at the period at which the pressure in the compressor cylinder reaches that of the delivered air under compression, they—the ports 15—will be in communication with the discharge or delivery port 12. And then at the end of the inward stroke of the piston 6, this sleeve valve 8 will have moved down, say into the position shown in Fig. 2; and communication between the interior of the cylinder and the port 12 will be closed.

The position given in Fig. 1 shows the sleeve valve ports 15 at the point of opening to the inlet port 10 just at or slightly subsequent to the end of the inward stroke of the piston 6.

Both cams 16 act to move the valve 8 up, acting on bowls 18; but one of the cams 6 has another part, as shown, which acts on a bowl 20 on the bottom of a carrier ring 19; and this part moves the sleeve valve down.

The sleeve valve 8, extends in the case shown, from one end to the other of the cylinder; and as stated, into an annular space between the depending portion of the cover 3, which is hollow and water lined, and the upper part of the wall of the cylinder; and the sleeve, therefore, constitutes, as it were, a cylinder liner, as well as a valve to it; and by the arrangement of cams, as shown and described on each side of the valve for working it up, pressure upward is direct and equally distributed.

The piston 6 has suitable packing rings in it for making fluid tight joints between itself and the inside of the sleeve 8.

In a pump or compressor of this kind, the clearance need be very small, and consequently loss of efficiency through this cause, can be kept very low.

With regard to the modification shown in Figs. 6 to 8, in this case, it is assumed that the sleeve valve 8 is operated by eccentrics or cranks, say on a crank shaft or a plurality of same in which case the valve ports 15 will be in communication with the cylinder discharge port 12, when the piston 6 begins its upstroke; and in such a case, to prevent a reflux of compressed air or gas into the cylinder from the compressed air delivery pipe or main, a non return valve 22 (or valves) is provided on this port so that communication is cut off between the cylinder delivery branch 13 until the pressure rises in the cylinder, due to the upward movement of the piston, sufficiently high to open the non return valve; and allow the compressed air or gas, to be delivered into the delivery pipe. The piston on reaching the top of the cylinder, reverses and commences to move downward and the non-return valve closes and in addition to this the ports 15 in the sleeve valve will also have cut off communication between the cylinder and the port 12. In such a case where the sleeve valve 8 is operated by eccentrics or cranks, and the point of delivery of compressed air in the compressing stroke, and entrance of air to the cylinder in the outstroke or at different points in the stroke, the use of the non-return valve (or valves) compensates or obviates any defect in working, from this cause. When on the other hand the sleeve valve is operated by cams as described, the opening and closing of the various ports can be made to take place exactly at the points it is desired; and therefore no valves other than it are required.

What is claimed is:—

1. An air or gas compressor comprising in combination a sleeve valve 8 working between a stationary cylinder wall and a moving piston, having a single set of ports 15 which are adapted to communicate with the cylinder, and alternately with separate air or gas inlet and discharge ports 10, 12 in the cylinder directly above or beyond one another; substantially as set forth.

2. In an air or gas compressor of the type herein referred to, the combination of a sleeve 8 having a single set of ports 15 in it; a cylinder having an inlet port 10, below or within the end of the cylinder and a delivery port 12 over or beyond the end, said ports being directly over or beyond one another in parallel planes, and the said single set of ports 15 being adapted to communicate permanently with the interior of the cylinder, and alternately with the inlet port 10, and with the delivery port 12; substantially as described.

3. An air or gas compressor comprising a cylinder having an inlet port, and a discharge port fitted with a non-return valve, the inlet and discharge ports being above or beyond one another; a sleeve valve disposed within the cylinder and having a single set of ports which communicate with the interior and alternately communicate with the inlet and discharge ports; and a piston which operates within the sleeve; substantially as described.

4. An air or gas compressor, comprising a cylinder having an inlet port near its end and a discharge port beyond the inlet port; a sleeve valve disposed within the cylinder, and reciprocated positively in each direction by cam mechanism and having a set of ports through which the inlet and exhaust occur, the same ports which communicate with the discharge communicating with the inlet alternately; and a piston disposed within the sleeve valve.

In testimony whereof I have signed my name to this specification in the presence of two subscribing witnesses.

TYRUS DOUGLAS BERKELEY.

Witnesses:
W. HOLDEN,
SIMEON JOHN RENDELL.